(12) United States Patent (10) Patent No.: US 8,374,478 B2
Marcouiller et al. (45) Date of Patent: Feb. 12, 2013

(54) FIBER OPTIC DUST CAP AND CONNECTOR FOR TERMINATING MULTI-FIBER OPTICAL CABLES

(75) Inventors: Thomas Marcouiller, Shakopee, MN (US); Tim Redmann, Carver, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 219 days.

(21) Appl. No.: 12/836,873

(22) Filed: Jul. 15, 2010

(65) Prior Publication Data

US 2011/0013876 A1 Jan. 20, 2011

Related U.S. Application Data

(60) Provisional application No. 61/226,449, filed on Jul. 17, 2009.

(51) Int. Cl.
*G02B 6/00* (2006.01)
*G02B 6/36* (2006.01)
(52) U.S. Cl. .............................. 385/139; 385/53; 385/76
(58) Field of Classification Search .................. 385/139
See application file for complete search history.

(56) References Cited

U.S. PATENT DOCUMENTS

| | | | |
|---|---|---|---|
| 5,214,730 A | 5/1993 | Nagasawa et al. | |
| 5,317,663 A | 5/1994 | Beard et al. | |
| 5,737,463 A | 4/1998 | Weiss et al. | |
| 5,867,621 A | 2/1999 | Luther et al. | |
| 6,085,003 A | 7/2000 | Knight | |
| 6,227,717 B1 * | 5/2001 | Ott et al. | 385/53 |
| 6,340,247 B1 | 1/2002 | Sakurai et al. | |
| 6,634,798 B2 * | 10/2003 | Cheng | 385/76 |
| 6,712,524 B2 | 3/2004 | Beatty et al. | |
| 6,886,988 B2 | 5/2005 | Brown et al. | |
| 7,164,840 B2 * | 1/2007 | Hsieh | 385/134 |
| 7,198,409 B2 | 4/2007 | Smith et al. | |
| 7,218,827 B2 | 5/2007 | Vongseng et al. | |
| 7,233,731 B2 | 6/2007 | Solheid et al. | |
| 7,245,813 B2 | 7/2007 | Brown et al. | |
| 7,277,620 B2 | 10/2007 | Vongseng et al. | |
| 7,407,330 B2 | 8/2008 | Smith et al. | |
| 7,457,503 B2 | 11/2008 | Solheid et al. | |
| 7,519,259 B2 | 4/2009 | Smith et al. | |
| 7,565,053 B2 | 7/2009 | Zimmel et al. | |
| 7,572,066 B2 * | 8/2009 | de Jong et al. | 385/88 |
| 7,583,883 B2 | 9/2009 | Kowalczyk et al. | |
| 7,988,367 B2 * | 8/2011 | Gurreri et al. | 385/53 |
| 8,041,177 B2 * | 10/2011 | Zimmel et al. | 385/139 |

(Continued)

OTHER PUBLICATIONS

USCONEC Customer Drawing, downloaded from http://www.usconec.com/graphics/product/customerdwg/plugs/C10063.pdf on Apr. 22, 2009; 1 pg.

(Continued)

*Primary Examiner* — Rhonda Peace
(74) *Attorney, Agent, or Firm* — Merchant & Gould P.C.

(57) ABSTRACT

A dust cap is adapted to cover an end of a fiber optic connector that includes a release sleeve. The dust cap includes a sleeve with an open end and a closed end, at least one resilient latch, a connector stop, and a sealing face. The dust cap is installed on the fiber optic connector by placing the open end of the sleeve over the end of the fiber optic connector. The resilient latch retains the dust cap on the fiber optic connector by latching to a second end of the release sleeve. The sealing face of the dust cap is adapted to abut a first end of the release sleeve, and the connector stop is adapted to abut a connector body of the fiber optic connector when the dust cap is fully installed.

21 Claims, 9 Drawing Sheets

U.S. PATENT DOCUMENTS

| | | | |
|---|---|---|---|
| 2003/0002812 A1* | 1/2003 | Lampert | 385/78 |
| 2003/0099442 A1* | 5/2003 | Cheng | 385/76 |
| 2004/0096165 A1 | 5/2004 | Childers et al. | |
| 2005/0220434 A1* | 10/2005 | Hsieh | 385/134 |
| 2005/0232551 A1* | 10/2005 | Chang et al. | 385/76 |
| 2007/0217749 A1* | 9/2007 | Jong et al. | 385/88 |
| 2008/0304804 A1 | 12/2008 | Zimmel et al. | |
| 2008/0317425 A1 | 12/2008 | Smith et al. | |
| 2009/0074372 A1 | 3/2009 | Solheid et al. | |
| 2009/0087157 A1* | 4/2009 | Smith et al. | 385/135 |
| 2009/0190896 A1 | 7/2009 | Smith et al. | |
| 2010/0111484 A1* | 5/2010 | Allen | 385/135 |
| 2011/0013876 A1* | 1/2011 | Marcouiller et al. | 385/139 |

OTHER PUBLICATIONS

USCONEC Customer Drawing; downloaded from www.usconec.com/graphics/product/customerdwg/plugs/C10254.pdf on Apr. 22, 2009; 1 pg.

USCONEC Customer Drawing; downloaded from http://www.usconec.com/graphics/product/customerdwg/plugs/ferrulecap.pdf on Apr. 22, 2009; 1 pg.

USCONEC Customer Drawing; downloaded from www.usconec.com/graphics/product/customerdwg/plugs/mtferrule7721.pdf on Apr. 22, 2009; 1 pg.

USCONEC Customer Drawing; downloaded from http://www.usconec.com/graphics/product/customerdwg/connectors/oval.pdf on Apr. 22, 2009; 2 pgs.

USCONEC Customer Drawing; downloaded from http://www.usconec.com/graphics/product/customerdwg/connectors/short.pdf on Apr. 22, 2009; 2 pgs.

USCONEC Customer Drawing; downloaded from http://www.usconec.com/graphics/product/customerdwg/connectors/round.pdf on Apr. 22, 2009; 2 pgs.

USCONEC Customer Drawing; downloaded from http://www.usconec.com/graphics/product/customerdwg/connectors/bare.pdf on Apr. 22, 2009; 2 pgs.

\* cited by examiner

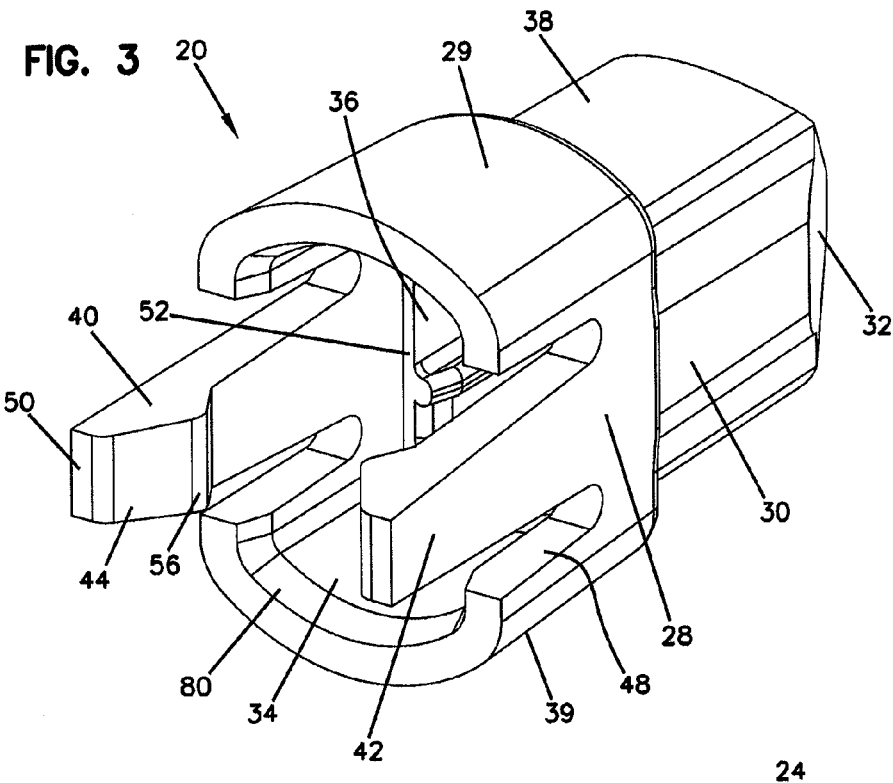
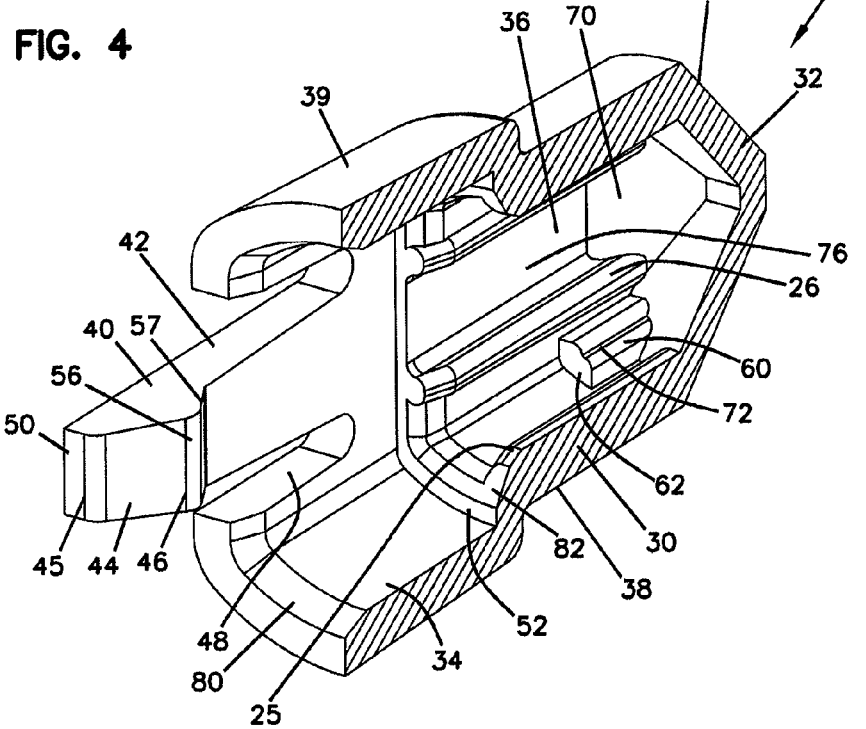

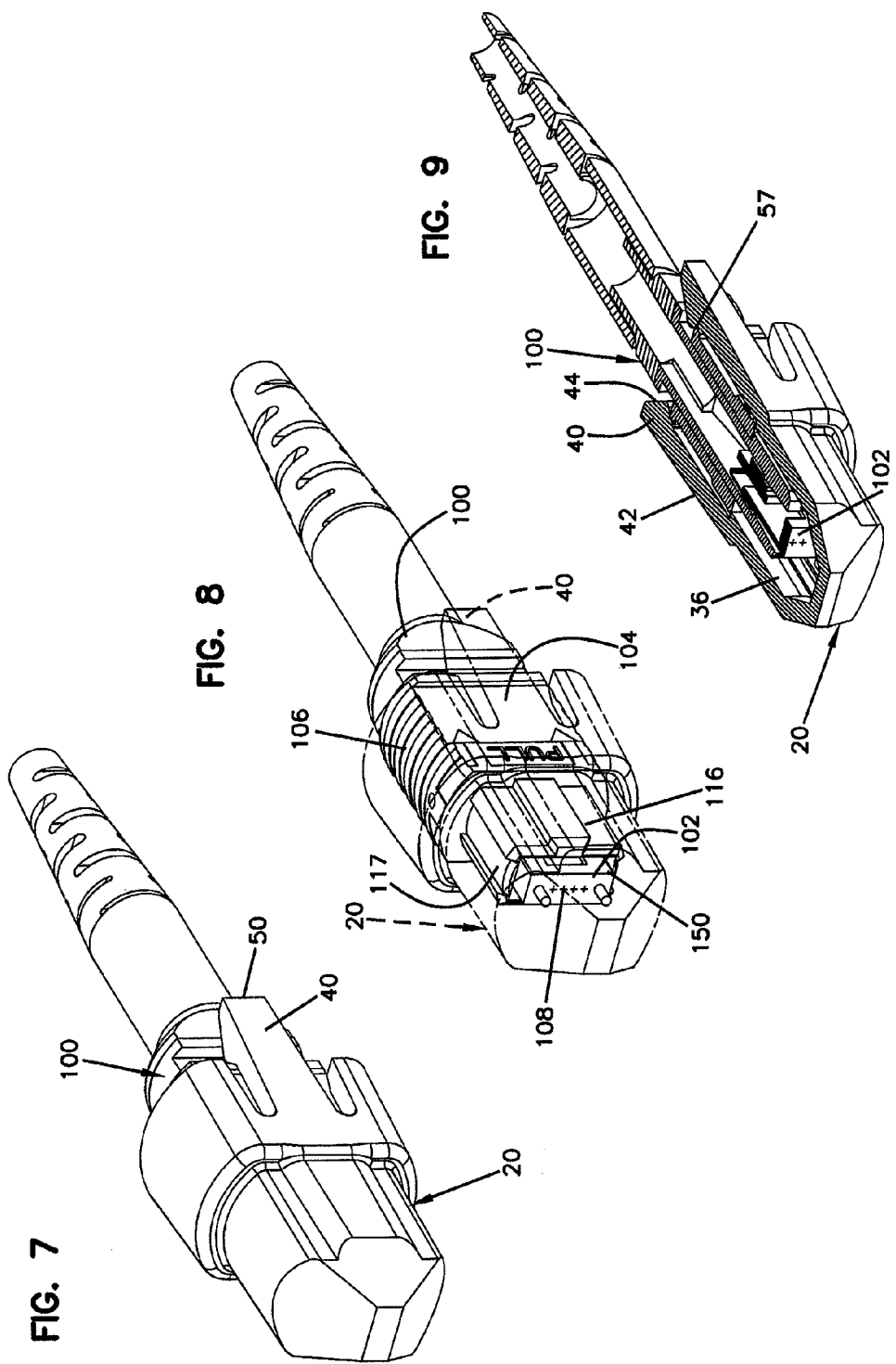

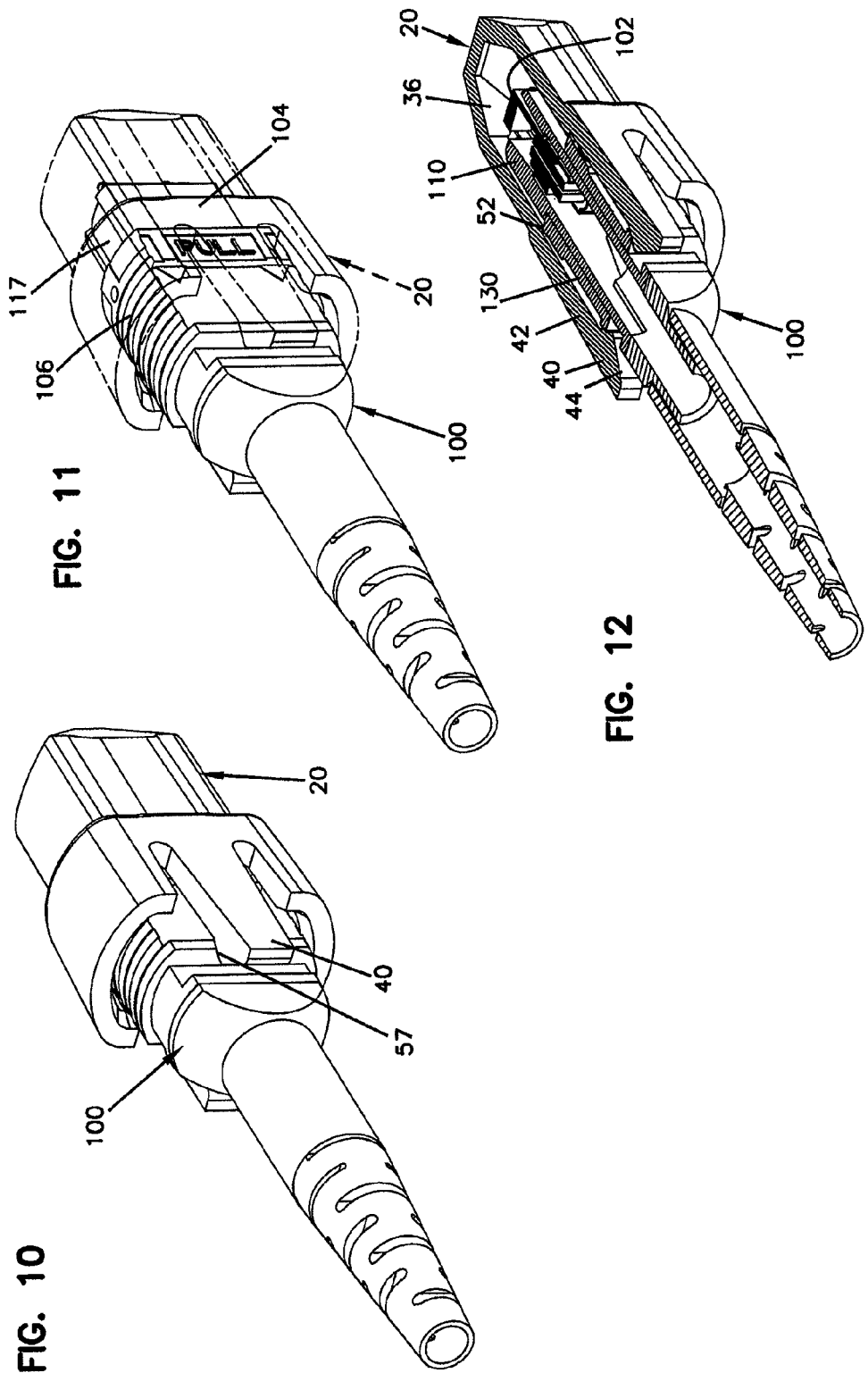

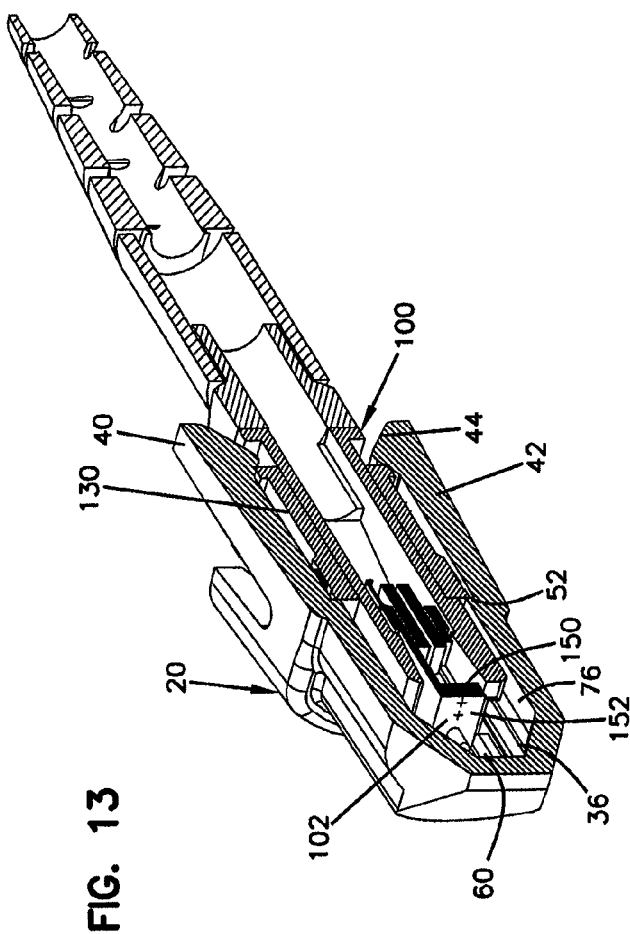
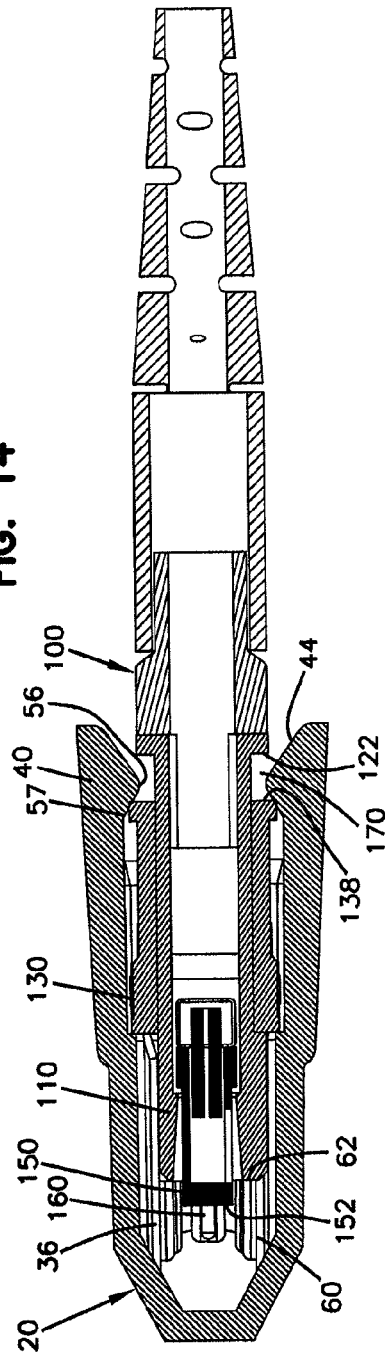

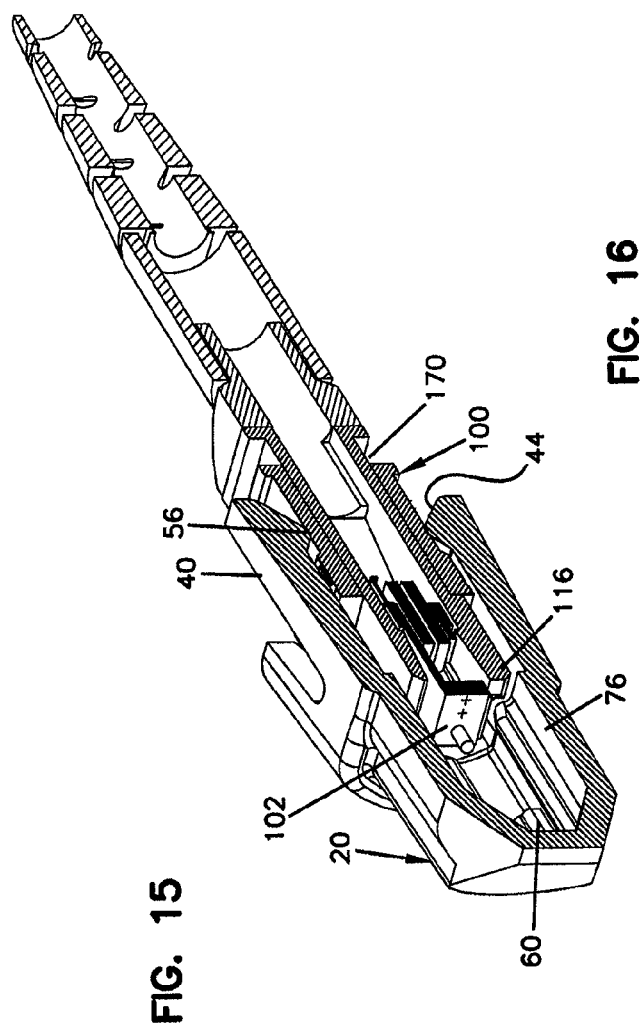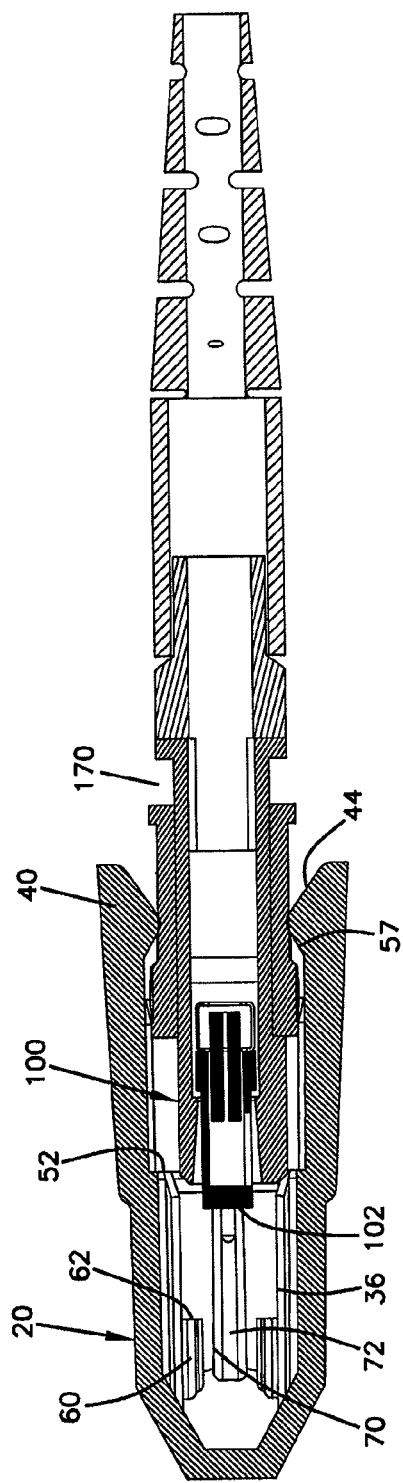

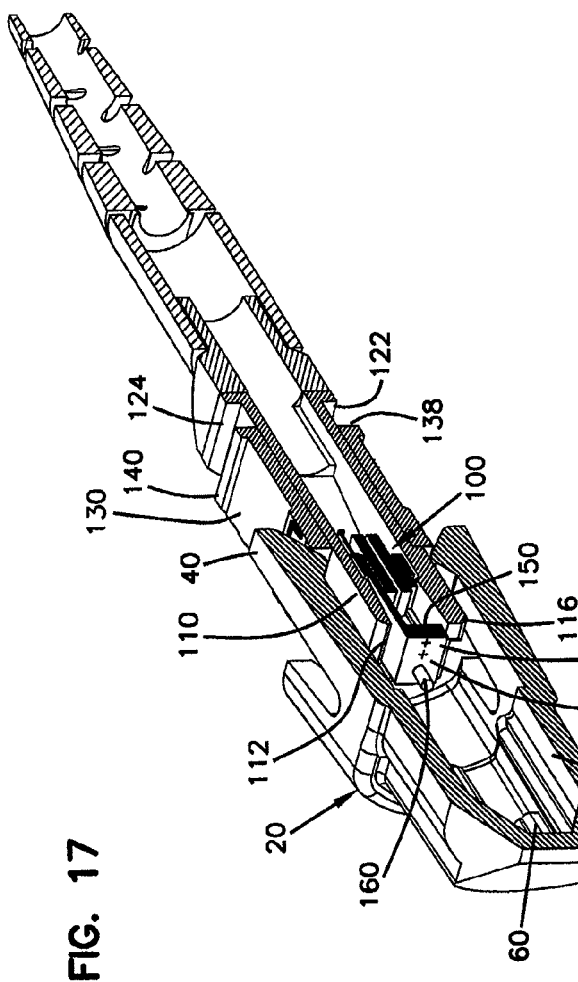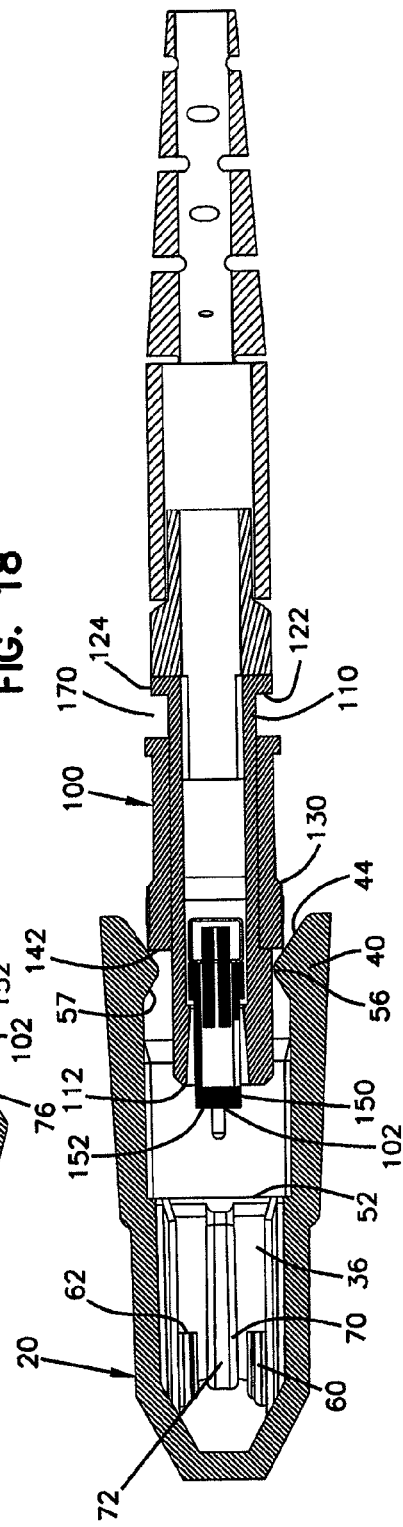

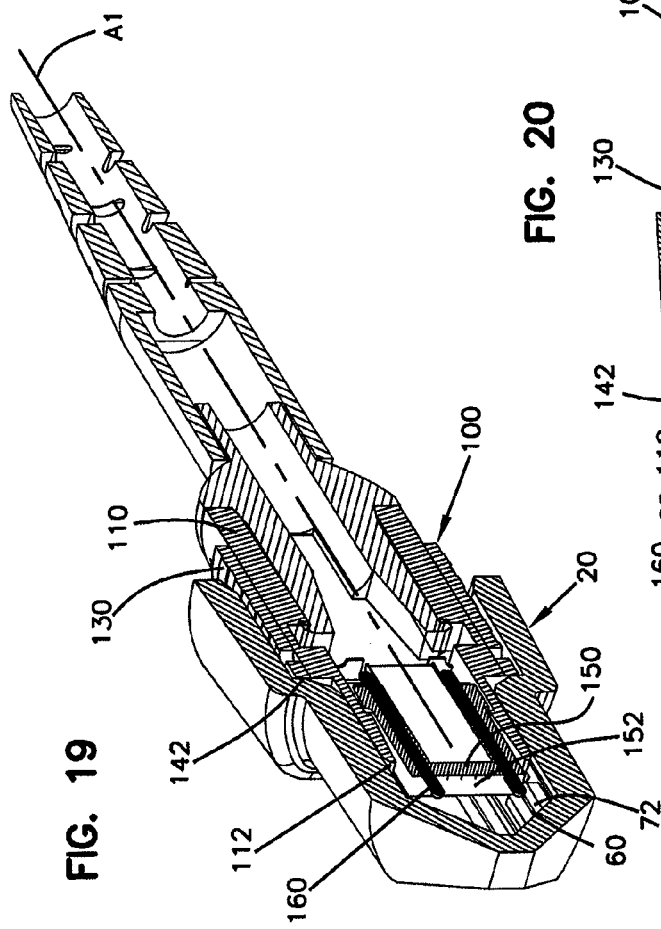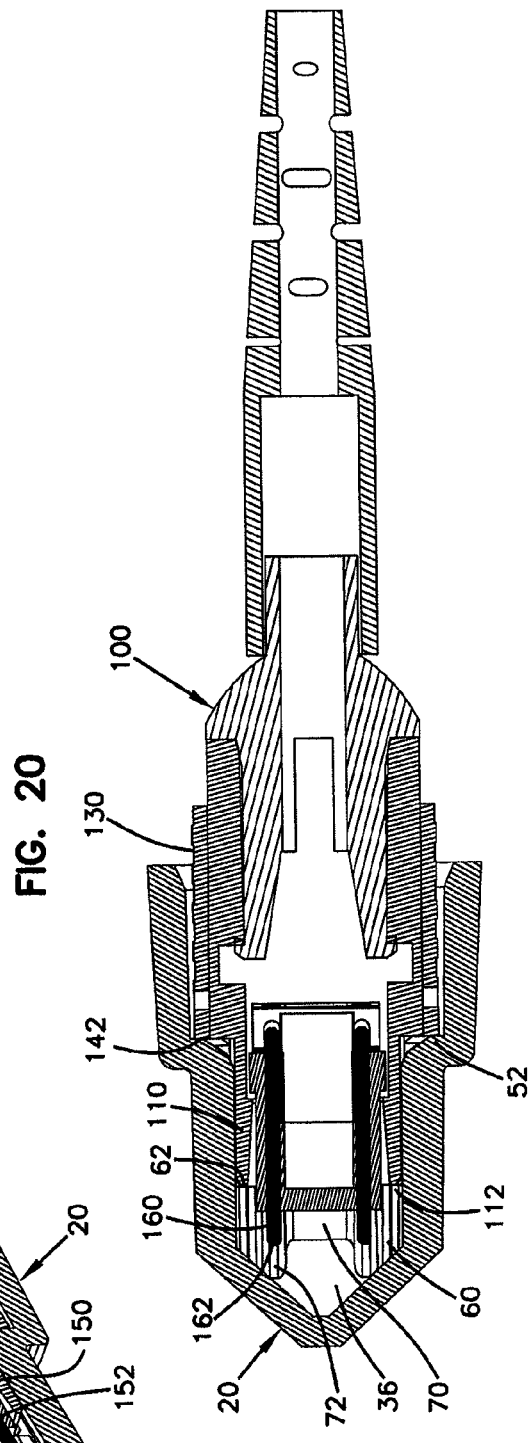

FIBER OPTIC DUST CAP AND CONNECTOR FOR TERMINATING MULTI-FIBER OPTICAL CABLES

CROSS-REFERENCE TO RELATED APPLICATION

This application claims the benefit of U.S. Provisional Patent Application Ser. No. 61/226,449, filed Jul. 17, 2009, which application is hereby incorporated by reference in its entirety.

TECHNICAL FIELD

The present disclosure relates to fiber optic data transmission, and more particularly to fiber optic cable connection systems.

BACKGROUND

Fiber optic cables are widely used to transmit light signals for high speed data transmission. The fiber optic cables include an optical fiber or optical fibers. The optical fibers function to carry the light signals (i.e., optical signals). A typical optical fiber includes an inner core surrounded by a cladding that is covered by a coating.

Fiber optic cable connection systems are used to facilitate connecting and disconnecting the fiber optic cables in the field without requiring a splice. A typical fiber optic cable connection system for interconnecting two fiber optic cables includes fiber optic connectors (i.e., optical fiber connectors) mounted at ends of the fiber optic cables, and an adapter for mechanically and optically coupling the fiber optic connectors together. The fiber optic connectors generally include ferrules that support ends of the optical fibers of the fiber optic cables. End faces of the ferrules are typically polished and are often angled. The adapter includes co-axially aligned ports (i.e., receptacles) for receiving the fiber optic connectors desired to be interconnected. The adapter may include an internal sleeve that receives and aligns the ferrules of the fiber optic connectors when the connectors are inserted within the ports of the adapter. With the ferrules and their associated fibers aligned and abutted within the sleeve of the adapter, a fiber optic signal can pass from one fiber to the next corresponding fiber via an optical interface created by this arrangement. The adapter also typically has a mechanical fastening arrangement (e.g., a snap-fit arrangement, a latch, etc.) for mechanically retaining the fiber optic connectors within the adapter.

A prior art fiber optic connection system is disclosed at U.S. Pat. No. 5,214,730 to Nagasawa et al., issued May 25, 1993, and hereby incorporated by reference in its entirety. Prior art fiber optic connectors include fiber optic connectors that are available from US Conec Ltd. of Hickory, N.C., USA as part numbers C10821, C10822, C8190, and C10823. Fiber optic connectors related to part numbers C10821, C10822, C8190, and C10823 are known as MTP® connectors. Other prior art fiber optic connection systems include SC type fiber optic connectors and adapters, disclosed at U.S. Pat. No. 5,317,663, that is hereby incorporated by reference in its entirety.

FIGS. 6, 8, and 11 generally illustrate certain features of certain MTP® connectors as example connector 100. The example connector 100 includes a plurality of optical fiber termination locations 108 at an end 102 of the connector 100 (see FIG. 8). The end 102 has a generally rectangular shape, and the plurality of the optical fiber termination locations 108 can form one or more rows aligned along a long dimension of the generally rectangular shape. The connector 100 has a somewhat rectangular cross-section, aligned with the generally rectangular shape of the end 102, with a long side 104 and a short side 106 (see FIGS. 8 and 11).

The example connector 100 includes a connector body 110, a release sleeve 130, a ferrule 150, and a pair of alignment pins 160. The connector body 110 extends from a first end 112 to a second end 114. The first end 112 is adapted to be inserted into a port of a fiber optic adapter, and the second end 114 connects directly or indirectly to a fiber optic cable (e.g. a group of optical fibers joined together in a flat ribbon by a polymeric coating). A key 116 can be included on the connector body 110 to properly rotationally orient the connector 100 and the fiber optic adapter when they are joined together (see FIGS. 8, 15, and 17). The example connector 100 includes the key 116 on one of the long sides 104. The connector body 110 can also include grooves 117 (see FIGS. 8 and 11) on one or both of the short sides 106. The grooves 117 can serve to align and rotationally orient the connector 100 and the fiber optic adapter when they are joined together. Latching features (not shown) can be included within the grooves 117 to enable connection of the connector 100 and the fiber optic adapter. A flange 124 can be included at or near the second end 114 of the connector body 110. An interior passage 126 extends through the connector body 110 from the first end 112 to the second end 114 and is adapted to house the optical fibers. An exterior 128 of the connector body 110 can be separated from the interior passage 126 by one or more walls 129 of the connector body 110 (see FIG. 6).

The release sleeve 130 of the connector 100 extends from a first end 132 to a second end 134. The release sleeve 130 is positioned around a portion of the exterior 128 of the connector body 110 with the first end 132 nearer the first end 112 of the connector body 110 and the second end 134 nearer the second end 114 of the connector body 110. A sliding surface 144 (e.g., a slide) of the release sleeve 130 can slidingly engage a sliding surface 118 (e.g., a slide guide) of the connector body 110 and thereby allow the release sleeve 130 to slide on the connector body 110 between a latching position (shown at FIG. 6) and a release position. When the release sleeve 130 is at the latching position and the connector 100 is fully inserted into the fiber optic adapter, the connector 100 is latched to the fiber optic adapter. By moving the release sleeve 130 from the latching position to the release position, the connector 100 is unlatched from the fiber optic adapter and can thereby be removed (i.e., disconnected) from the fiber optic adapter.

The release sleeve 130 is typically biased toward the latching position (e.g., by a spring). FIG. 6 pictorially depicts a first stop 120 on the connector body 110 adjacent a first stop 136 on the release sleeve 130. A spring (not shown) can urge the first stop 136 against the first stop 120 and thereby urge the release sleeve 130 to the latching position. When the release sleeve 130 is moved to the release position, a second stop 122 of the connector body 110 can abut a second stop 138 of the release sleeve 130. The first stop 120 of the connector body 110 can be included on the key 116 (as shown at FIG. 6) or can be a separate feature, and the first stop 136 of the release sleeve 130 can be included at the first end 132 (as shown at FIG. 6) or can be located elsewhere. Likewise, the second stop 122 of the connector body 110 can be included on the flange 124 (as shown at FIG. 6) or can be a separate feature, and the second stop 138 of the release sleeve 130 can be included at a flange 140 (as shown at FIG. 6) or can be located elsewhere.

The example connector 100 defines a central longitudinal axis A1 (see FIGS. 6 and 19). The release sleeve 130 can be slid back and forth relative to the connector body 110 through a limited range of movement that extends in a direction along the central longitudinal axis A1. When the release sleeve 130 is in the latching position, a gap 170 is defined between the second end 134 of the release sleeve 130 and the flange 124.

The ferrule 150 is adapted to hold one or more optical fibers of the fiber optic cable and terminate the ends of the optical fibers at an end 152 (i.e. a terminal end) of the ferrule 150. The end 152 of the ferrule 150 coincides with the end 102 of the connector 100, and the plurality of the optical fiber termination locations 108 are on the ferrule 150 (see FIG. 8).

The ferrule 150 can also include a pin 160 or a pair of the pins 160 that extends to an end 162 spaced from the end 152 of the ferrule 150 and thereby engender the connector 100 as a male fiber optic connector as illustrated at FIG. 6. The ferrule 150 can also include a pin hole or a pair of the pin holes and thereby engender the connector 100 as a female fiber optic connector. The ferrule 150 can also include one pin 160 and one pin hole and thereby engender the connector 100 as a hermaphroditic fiber optic connector (see FIG. 4A of U.S. Pat. No. 6,340,247 to Sakurai et al., issued Jan. 22, 2002).

As shown at FIGS. 27 and 28 of U.S. Pat. No. 5,214,730, when coupled together in a functional configuration, two of the example connectors 100 and the corresponding adapter provide the optical interface protection from contamination. In particular, overlapping fits of the ports of a housing around the connectors 100 provide a layer of protection to the optical interface. When either of the connectors 100 is disconnected from the adapter, the disconnected optical interface is exposed to contamination around the ferrule 150 of the connector 100. The optical interface is sensitive to contamination. If the optical interface is contaminated, the fiber optic signal connection may be disrupted or weakened upon reconnection.

Dust caps have been developed to protect the connector 100, and in particular the ferrule 150, from contamination when disconnected. Such a dust cap is disclosed at U.S. Pat. No. 7,245,813 to Brown et al., issued Jul. 17, 2007, hereinafter referred to as the '813 dust cap. A commercial embodiment of the '813 dust cap is available from US Conec Ltd. of Hickory, N.C., USA as part number C7721. Another such dust cap is also available from US Conec as part number C 10063. Other example dust caps are disclosed at U.S. Patent Application Publication No. 2008/0304804 to Zimmel et al., published Dec. 11, 2008; now U.S. Pat. No. 7,565,053, issued Jul. 21, 2009; U.S. Pat. No. 7,164,840 to Hsieh, issued Jan. 16, 2007; and U.S. Pat. No. 6,712,524 to Beatty et al., issued Mar. 30, 2004.

SUMMARY

One aspect of the present disclosure relates to a dust cap and an optical fiber connector. The dust cap is adapted to cover an end of the optical fiber connector. The dust cap includes a sleeve, at least one resilient latch, and at least one connector stop. The sleeve has a central axis and defines a cavity for receiving the end of the optical fiber connector. The cavity extends along the central axis of the sleeve and has an open end positioned opposite from a closed end. The at least one resilient latch of the dust cap is adjacent the open end of the sleeve. The at least one connector stop of the dust cap is positioned within the sleeve and includes a shoulder facing toward the open end of the sleeve.

The optical fiber connector includes a connector body, a ferrule, and a release sleeve. The connector body extends from a first end to a second end and defines an interior passage that extends between the first and the second ends of the connector body. The interior passage is adapted to receive optical fibers through the second end of the connector body. The connector body includes an exterior portion that defines a slide guide, and the connector body defines a slide stop. The ferrule is adapted to receive and terminate at least one optical fiber and is positioned at least partially within the interior passage of the connector body. The ferrule includes a terminal end that extends beyond the first end of the connector body. The release sleeve of the optical fiber connector is positioned over a portion of the connector body. The release sleeve extends from a first end to a second end. The first end of the release sleeve is positioned nearer the first end of the connector body, and the second end of the release sleeve is positioned nearer the second end of the connector body. The release sleeve includes a slide that slidingly connects the release sleeve to the slide guide of the connector body. The release sleeve includes a sleeve stop that is adapted to engage the slide stop of the connector body to prevent the release sleeve from sliding beyond a predetermined location on the connector body. The shoulder of the at least one connector stop of the dust cap abuts the first end of the connector body when the dust cap is fully installed on the optical fiber connector. The at least one resilient latch of the dust cap latches to the second end of the release sleeve when the dust cap is fully installed on the optical fiber connector.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

FIG. 3 is a reverse perspective view of the dust cap of FIG. 1;

FIG. 4 is the reverse perspective view of FIG. 3 of the dust cap of FIG. 1 with a right half of the dust cap cut away;

FIG. 7 is a perspective view of the dust cap of FIG. 1 assembled on the example fiber optic connector of FIG. 6;

FIG. 8 is the perspective view of FIG. 7 but with the dust cap of FIG. 1 shown in phantom line and the example fiber optic connector of FIG. 6 showing through the dust cap;

FIG. 9 is the perspective view of FIG. 7 but with a top half of the dust cap of FIG. 1 and the example fiber optic connector of FIG. 6 cut away;

FIG. 10 is a reverse perspective view of the dust cap of FIG. 1 assembled on the example fiber optic connector of FIG. 6;

FIG. 11 is the reverse perspective view of FIG. 10 but with the dust cap of FIG. 1 shown in phantom line and the example fiber optic connector of FIG. 6 showing through the dust cap;

FIG. 12 is the reverse perspective view of FIG. 10 but with a top half of the dust cap of FIG. 1 and the example fiber optic connector of FIG. 6 cut away;

FIG. 13 is another perspective view of the dust cap of FIG. 1 fully assembled on the example fiber optic connector of FIG. 6 with the top half of the dust cap and the example fiber optic connector cut away;

FIG. 14 is a top cross-sectional plan view of the dust cap of FIG. 1 fully assembled on the example fiber optic connector of FIG. 6;

FIG. 15 is the perspective view of FIG. 13 of the dust cap of FIG. 1 partially assembled on the example fiber optic connector of FIG. 6 with the top half of the dust cap and the example fiber optic connector cut away;

FIG. 16 is a top cross-sectional plan view of the dust cap of FIG. 1 partially assembled on the example fiber optic connector of FIG. 6;

FIG. 17 is the perspective view of FIG. 13 of the dust cap of FIG. 1 disconnected from the example fiber optic connector of FIG. 6 with the top half of the dust cap and the example fiber optic connector cut away;

FIG. 18 is a top cross-sectional plan view of the dust cap of FIG. 1 disconnected from the example fiber optic connector of FIG. 6;

FIG. 19 is the perspective view of FIG. 1 showing the dust cap of FIG. 1 fully assembled on the example fiber optic connector of FIG. 6 with the left half of the dust cap and the example fiber optic connector cut away; and FIG. 20 is a left cross-sectional elevation view of the dust cap of FIG. 1 fully assembled on the example fiber optic connector of FIG. 6.

DETAILED DESCRIPTION

Figure 1:
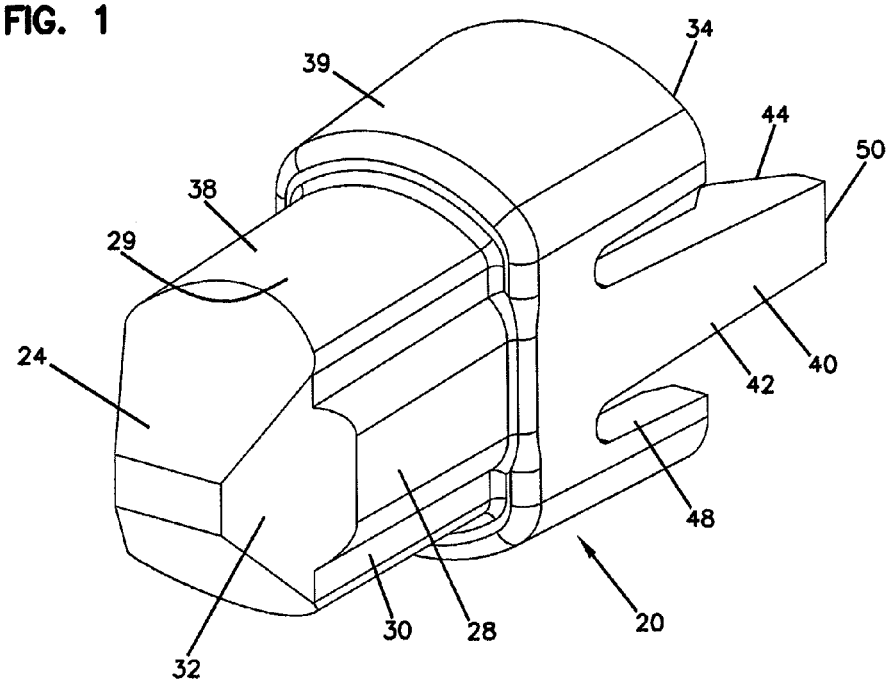
FIG. 1 is a perspective view of a dust cap for a fiber optic connector.
Figure 2:
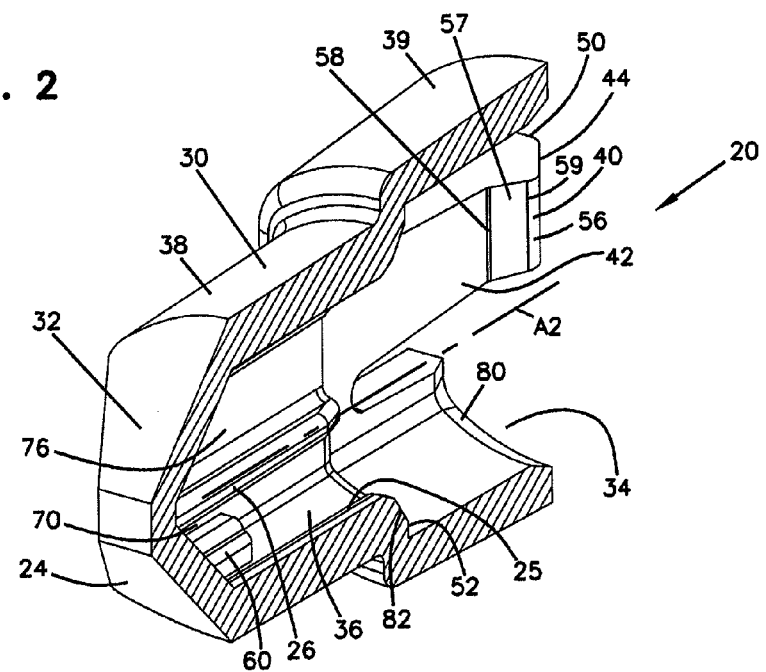
FIG. 2 is the perspective view and the dust cap of FIG. 1 with a left half of the dust cap cut away.
Figure 5:
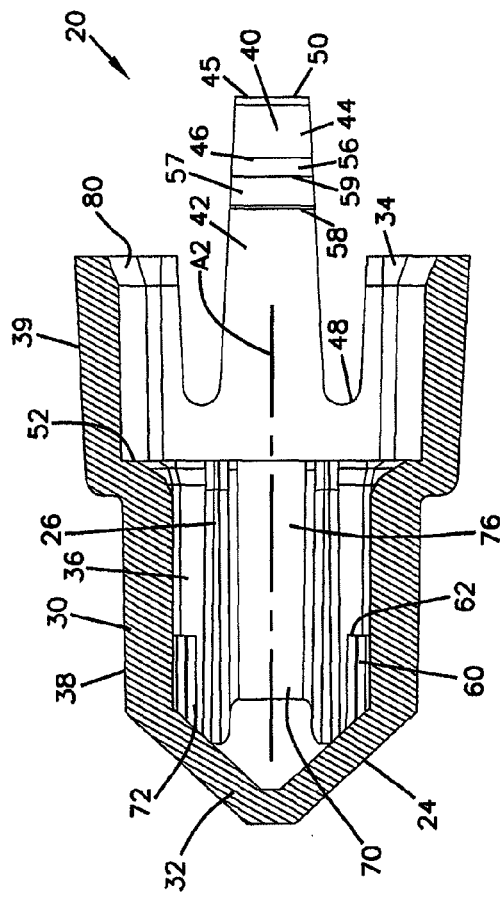
FIG. 5 is a left cross-sectional elevation view of the dust cap of FIG. 1.
Figure 6:
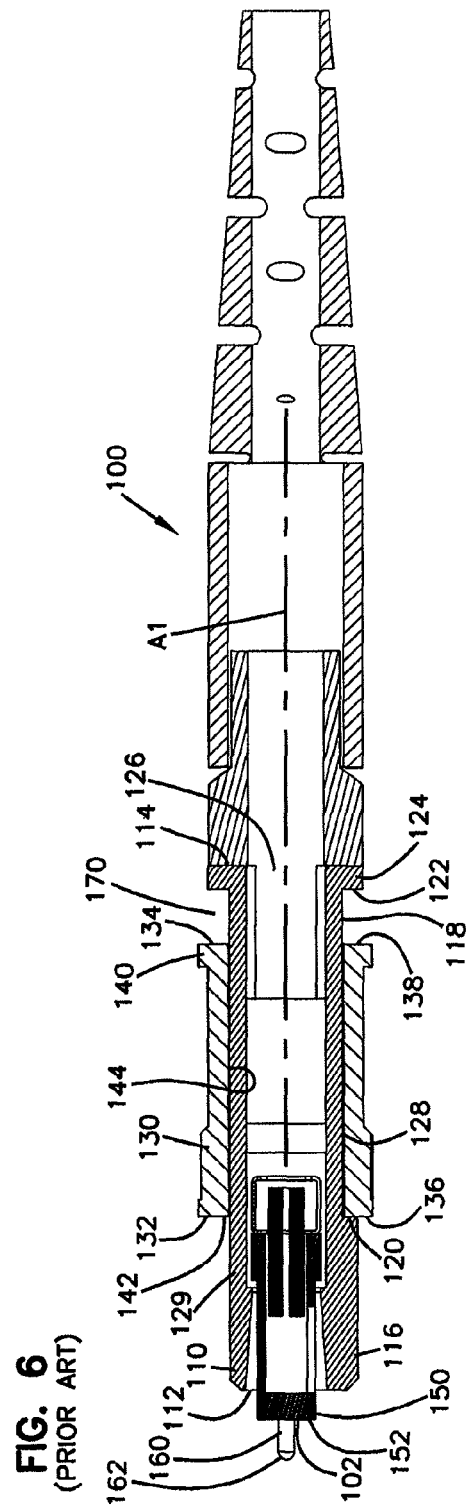
FIG. 6 is a top cross-sectional plan view of an example fiber optic connector.

The present disclosure concerns dust caps and corresponding optical fiber connectors. The dust caps can cover an end of the corresponding optical fiber connectors. FIGS. 1-5 illustrate an example dust cap 20 described and referred to in the present disclosure. FIGS. 6, 8, and 11 illustrate an example fiber optic connector 100 (i.e., an optical fiber connector) described and referred to in the present disclosure. The dust cap 20 is adapted to cover an end 102 of the fiber optic connector 100 and attach to the fiber optic connector 100.

The example fiber optic connector 100 includes a release sleeve 130 slidingly mounted over a connector body 110. The example dust cap 20 is adapted to latch to the release sleeve 130 and thereby retain itself to the fiber optic connector 100. The example dust cap 20 is adapted to seal with the release sleeve 130 and thereby shield the end 102 of the fiber optic connector 100 from contamination. The example dust cap 20 stops against the connector body 110 when installed on the fiber optic connector 100. The example dust cap 20 includes a cavity that is positioned over optical fiber terminations of the fiber optic connector 100 when installed and thereby protects the optical fiber terminations from physical damage. The example dust cap 20 includes recesses that are positioned over pins 160 of the fiber optic connector 100 when installed and thereby protects the pins 160 from physical damage. The example dust cap 20 is made from a material that dissipates static electricity and thereby avoids electro-statically attracting contamination. The example dust cap 20 is made from a material that does not outgas and thereby does not cause or contribute to contamination by out-gassing. The example dust cap 20 is made from a rigid material and thus resists deforming under applied loads. In one embodiment, the dust cap 20 is made from a polypropylene material.

The dust cap 20 includes a sleeve 30 having a closed end 32 and an open end 34. The sleeve 30 defines a central axis A2 (see FIGS. 2 and 5) that extends from the closed end 32 to the open end 34. A cavity 36 is formed within the sleeve 30 and includes at least one connector stop 60 (i.e., a stop) with a shoulder 62. The shoulder 62 faces the open end 34 of the sleeve 30. The dust cap 20 can be installed on the fiber optic connector 100 by placing the open end 34 over the end 102 of the fiber optic connector 100. Chamfers 80, adjacent the open end 34, can guide the fiber optic connector 100 into the cavity end 34. The central axis A2 of the sleeve 30 is then generally aligned with a central longitudinal axis A1 of the fiber optic connector 100, and the cavity 36 is positioned over at least a portion of the fiber optic connector 100. The dust cap 20 is then urged onto the fiber optic connector 100 by pressing the dust cap 20 in a direction from the closed end 32 toward the open end 34. Upon the shoulder 62 of the connector stop 60 abutting a first end 112 of the connector body 110, the dust cap 20 is fully installed on the fiber optic connector 100 (see FIGS. 7-12). Four of the connector stops 60 are positioned at or near four corners of the cavity 36 of the example dust cap 20. The four connector stops 60 abut at or near four corners of the first end 112 of the connector body 110 when the dust cap 20 is fully installed on the fiber optic connector 100. Contact between the four shoulders 62 of the four connector stops 60 and the first end 112 of the connector body 110 can provide stability to the dust cap 20 when fully installed and prevent the pins 160 from contacting the closed end 32 of the dust cap 20.

The dust cap 20 can include a tapered nose 24 at the closed end 32. The dust cap 20 can include broad sides 28 and narrow sides 29 that generally align with a long side 104 and a short side 106 of the fiber optic connector 100 respectively. The dust cap 20 can include a connector body covering portion 38, that primarily covers the connector body 110, and a release sleeve covering portion 39 that primarily covers the release sleeve 130 of the fiber optic connector 100. A chamfer 82 can be provided within the sleeve 30 between the connector body covering portion 38 and the release sleeve covering portion 39 to guide the fiber optic connector 100 into the connector body covering portion 38 of the dust cap 20.

A clearance recess 70 can be provided within the sleeve 30 of the dust cap 20 that houses an end 152 of a ferrule 150 of the fiber optic connector 100 when the dust cap 20 is fully installed on the fiber optic connector 100. The clearance recess 70 maintains clearance between the end 152 of the ferrule 150 and the dust cap 20, even under external loads that may be applied to the dust cap 20. The clearance recess 70 thereby protects the end 152 of the ferrule 150 including optical fiber termination locations 108 at the end 102 of the fiber optic connector 100. In one embodiment, about 0.04 inch to about 0.06 inch of clearance is provided between the end 152 of the ferrule 150 and the clearance recess 70 when the dust cap 20 is fully installed on the fiber optic connector 100.

At least one pin recess 72 can be provided within the sleeve 30 of the dust cap 20 that houses the pin 160 at the end 102 of the fiber optic connector 100 when the dust cap 20 is fully installed on the fiber optic connector 100 (see FIGS. 19 and 20). The example fiber optic connector 100 can have two pins 160, one pin 160, or no pins at the end 102. The at least one pin recess 72 can be devoid of the pin 160 when the dust cap 20 is used on the fiber optic connector 100 that has no pins to fill the pin recess 72. The pin recess 72 maintains clearance between the pin 160 and the dust cap 20, even under external loads that may be applied to the dust cap 20. The pin recess 72 thereby protects the pin 160 at the end 102 of the fiber optic connector 100. The pin recess 72 can cooperate with the shoulders 62 of the connector stops 60 to provide protection to the pin 160.

A keyway 76 can be provided within the sleeve 30 of the dust cap. The keyway 76 aligns with a key 116 of the fiber optic connector 100 when the dust cap 20 is installed on the fiber optic connector 100. In the example fiber optic connector 100, keyways 76 are positioned at each of the broad sides 28. The keyways 76 are formed by a pair of interior ribs 26 that straddle each of the keyways 76. The keyway 76 not occupied by the key 116 can serve as a vent.

A pair of interior ribs 25 can be provided within the sleeve 30 of the dust cap 20. The interior ribs 25 are positioned at the narrow sides 29 of the dust cap 20 opposite the central axis A2 from each other. The interior ribs 25 align with the grooves 117 of the connector body 110 when the dust cap 20 is installed on the fiber optic connector 100.

The interior ribs 25, 26 within the sleeve 30 of the dust cap 20 can be configured to slide against an exterior of the connector body 110 when the dust cap 20 is being installed on the fiber optic connector 100. Contact between the interior ribs 25, 26 and the exterior of the connector body 110 can provide stability to the dust cap 20 when the dust cap 20 is fully installed on the fiber optic connector 100.

A sealing face 52 can be provided within the sleeve 30 at an intermediate location between the closed end 32 and the open end 34 of the sleeve 30. The sealing face 52 faces toward the open end 34 of the sleeve 30. The sealing face 52 is substantially perpendicular to the central axis A2 of the sleeve 30. The sealing face 52 can be positioned at a boundary region between the connector body covering portion 38 and the release sleeve covering portion 39 of the dust cap 20. The sealing face 52 can be adjacent the chamfer 82. The sealing face 52 is adapted to abut a first end 132 of the release sleeve 130 of the fiber optic connector 100. The first end 132 of the release sleeve 130 is thus used as a sealing face 142. The sealing face 52 of the dust cap 20 seals against the sealing face 142 of the release sleeve 130 when the dust cap 20 is fully installed on the fiber optic connector 100. The abutted sealing faces 52, 142 do not have to provide an airtight seal or a watertight seal and may only provide a barrier to dust and/or other contamination from entering the cavity 36 of the dust cap 20 when the dust cap 20 is fully installed on the fiber optic connector 100. The sealing faces 52, 142 can therefore be contacting faces or abutment faces.

At least one resilient latch 40 can be provided on the dust cap 20 adjacent the open end 34 of the sleeve 30. The example dust cap 20 includes a pair of the resilient latches 40 positioned on opposite sides of the central axis A2 from each other. The resilient latches 40 are positioned on the narrow sides 29 of the dust cap 20. The resilient latch 40 can include a cantilevered arm 42 extending from a base at the sleeve 30 to a cantilevered end 50. The cantilevered arm 42 extends in a direction predominantly from the closed end 32 to the open end 34 of the sleeve 30. Cuts 48 (i.e., slots) can be formed on the release sleeve covering portion 39 of the dust cap 20. The cuts 48 can form at least a portion of a boundary of the cantilevered arm 42. The cantilevered end 50 of the cantilevered arm 42 can extend beyond the open end 34 of the sleeve 30 as shown at FIGS. 1-5. Alternatively, the cantilevered end 50 of the cantilevered arm 42 can substantially coincide with a plane defined by the open end 34 of the sleeve, or the cantilevered end 50 of the cantilevered arm 42 can be positioned between the open end 34 of the sleeve 30 and the sealing face 52 of the dust cap 20.

The resilient latch 40 can include an inclined surface 44 with a first end 46 and a second end 45. The second end 45 of the inclined surface 44 can be adjacent the cantilevered end 50 of the cantilevered arm 42, and the first end 46 of the inclined surface 44 can be positioned nearer to the closed end 32 and the central axis A2 of the sleeve 30 than the second end 45. The resilient latch 40 can include a peak 56 adjacent the first end 46 of the inclined surface 44. The resilient latch 40 can include a declined surface 57 with a first end 58 and a second end 59. The second end 59 of the declined surface 57 can be adjacent the peak 56, and the first end 58 of the declined surface 57 can be positioned nearer to the closed end 32 and farther from the central axis A2 of the sleeve 30 than the second end 59 of the declined surface 57.

As illustrated at FIGS. 13-18, the inclined surface 44 of the resilient latch 40 spreads the cantilevered end 50 of the cantilevered arm 42 away from the central axis A2 by contacting the release sleeve 130 when the dust cap 20 is installed over the fiber optic connector 100. The cantilevered arm 42 at least partially returns toward the central axis A2 when the dust cap 20 is fully installed on the fiber optic connector 100. The declined surface 57 of the resilient latch 40 is positioned adjacent the second end 134 of the release sleeve 130 when the dust cap 20 is fully installed on the fiber optic connector 100. The peak 56 of the resilient latch 40 can be positioned within a gap 170 that is defined between the second end 134 of the release sleeve 130 and a flange 124 at or near the second end 114 of the connector body 110. By having the peak 56 positioned within the gap 170, a detent is formed to retain the dust cap 20 on the fiber optic connector 100 when it is fully installed. Furthermore, the sealing face 52 of the dust cap 20 is pressed (i.e., urged) against the sealing face 142 of the release sleeve 130 by the declined surface 57 of the resilient latch 40 pressing against the second end 134 of the release sleeve 130 when the dust cap 20 is fully installed on the fiber optic connector 100.

The release sleeve 130 can slide on the connector body 110 between a first position (e.g., a latching position shown at FIG. 6), at a first location, and a second position (e.g., a release position), at a second location. In addition to retaining the dust cap 20 on the fiber optic connector 100 and urging the sealing faces 52, 142 together, the release sleeve 130 of the fiber optic connector 100 is held at the first position by the latching features described in the preceding paragraph.

FIGS. 13-18 also illustrate a removal process for removing the dust cap 20 from the fiber optic connector 100. In particular, the declined surfaces 57 can spread the cantilevered arms 42 apart by engaging the second end 134 of the release sleeve 130 when the dust cap 20 is pulled from the fiber optic connector 100.

From the forgoing detailed description, it will be evident that modifications and variations can be made in the devices of the disclosure without departing from the spirit or scope of the invention.

What is claimed is:

1. A dust cap and an optical fiber connector, the dust cap adapted to cover an end of the optical fiber connector, the dust cap and the optical fiber connector comprising:

a sleeve of the dust cap, the sleeve having a central axis and defining a cavity for receiving the end of the optical fiber connector, the cavity extending along the central axis of the sleeve and having an open end positioned opposite from a closed end;

at least one resilient latch of the dust cap adjacent the open end of the sleeve;

at least one connector stop of the dust cap positioned within the sleeve, the at least one connector stop including a shoulder facing toward the open end of the sleeve;

a connector body of the optical fiber connector, the connector body extending from a first end to a second end, the connector body defining an interior passage extending between the first and the second ends of the connector body, the interior passage adapted to receive optical fibers through the second end of the connector body, the connector body including an exterior portion that defines a slide guide, and the connector body defining a slide stop;

a ferrule of the optical fiber connector, the ferrule adapted to receive and terminate at least one optical fiber; the ferrule positioned at least partially within the interior passage of the connector body; and the ferrule including a terminal end extending beyond the first end of the connector body; and a release sleeve of the optical fiber connector positioned over a portion of the connector body, the release sleeve extending from a first end to a second end, the first end of the release sleeve positioned nearer the first end of the connector body, the second end of the release sleeve positioned nearer the second end of the connector body, the release sleeve being slidingly mounted over the slide guide of the connector body; and the release sleeve including a sleeve stop adapted to engage the slide stop of the connector body to prevent the release sleeve from sliding beyond a predetermined location on the connector body;

wherein the shoulder of the at least one connector stop of the dust cap abuts the first end of the connector body when the dust cap is fully installed on the optical fiber connector; and wherein the at least one resilient latch of the dust cap latches to the second end of the release sleeve when the dust cap is fully installed on the optical fiber connector.

2. The dust cap and the optical fiber connector of claim 1, further comprising a sealing face of the dust cap, the sealing face facing toward the open end of the sleeve.

3. The dust cap and the optical fiber connector of claim 2, wherein the sealing face of the dust cap is adapted to abut the first end of the release sleeve when the dust cap is fully installed on the optical fiber connector.

4. The dust cap and the optical fiber connector of claim 2, wherein the sealing face of the dust cap is perpendicular to the central axis of the sleeve.

5. The dust cap and the optical fiber connector of claim 1, wherein the at least one resilient latch includes a pair of the resilient latches positioned on opposite sides of the central axis of the sleeve.

6. The dust cap and the optical fiber connector of claim 1, wherein the at least one resilient latch includes a cantilevered arm extending from the sleeve in a direction predominantly from the closed end toward the open end of the sleeve.

7. The dust cap and the optical fiber connector of claim 6, wherein the at least one resilient latch includes a pair of the resilient latches positioned on opposite sides of the central axis of the sleeve.

8. The dust cap and the optical fiber connector of claim 6, wherein the at least one resilient latch includes an inclined surface having a first end and a second end, the second end of the inclined surface positioned adjacent an end of the cantilevered arm and the first end of the inclined surface positioned nearer to the closed end and the central axis of the sleeve than the second end of the inclined surface, wherein the at least one resilient latch includes a peak adjacent the first end of the inclined surface, and wherein the at least one resilient latch includes a declined surface having a first end and a second end, the second end of the declined surface positioned adjacent the peak and the first end of the declined surface positioned nearer to the closed end and farther from the central axis of the sleeve than the second end of the declined surface.

9. The dust cap and the optical fiber connector of claim 8, wherein the inclined surface of the at least one resilient latch spreads the end of the cantilevered arm away from the central axis by contacting the release sleeve when the dust cap is installed over the optical fiber connector, wherein the end of the cantilevered arm at least partially returns toward the central axis when the dust cap is fully installed on the optical fiber connector, and wherein the declined surface of the at least one resilient latch is positioned adjacent the second end of the release sleeve when the dust cap is fully installed on the optical fiber connector.

10. The dust cap and the optical fiber connector of claim 9, further comprising a sealing face of the dust cap, the sealing face facing toward the open end of the sleeve, wherein the sealing face of the dust cap is adapted to abut the first end of the release sleeve when the dust cap is fully installed on the optical fiber connector, and wherein the sealing face of the dust cap is pressed against the first end of the release sleeve by the declined surface of the at least one resilient latch pressing against the second end of the release sleeve when the dust cap is fully installed on the optical fiber connector.

11. The dust cap and the optical fiber connector of claim 1, further comprising a clearance recess of the dust cap, the clearance recess adapted to house the terminal end of the ferrule of the optical fiber connector when the dust cap is fully installed on the optical fiber connector.

12. The dust cap and the optical fiber connector of claim 1, further comprising at least one pin recess of the dust cap and at least one alignment pin of the optical fiber connector, the at least one pin recess adapted to house the at least one alignment pin when the dust cap is fully installed on the optical fiber connector.

13. The dust cap and the optical fiber connector of claim 12, wherein the sleeve stop of the release sleeve is a first sleeve stop and the slide stop of the connector body is a first slide stop, wherein the release sleeve includes a second sleeve stop and the connector body includes a second slide stop, wherein the predetermined location of the release sleeve on the connector body is a first location of the release sleeve on the connector body with the first sleeve stop abutting the first slide stop, wherein a second location of the release sleeve on the connector body is reached when the second sleeve stop abuts the second slide stop, wherein the first end of the release sleeve is nearer to the first end of the connector body when the release sleeve is at the first location and the first end of the release sleeve is farther from the first end of the connector body when the release sleeve is at the second location; and wherein the fully installed dust cap can be urged in a direction from the first end to the second end of the connector body while the release sleeve is moved from the first location to the second location without the at least one alignment pin contacting the dust cap.

14. The dust cap and the optical fiber connector of claim 1, further comprising at least one keyway of the dust cap and a key of the optical fiber connector, the at least one keyway adapted to receive the key.

15. A dust cap for use on a fiber optic connector, the dust cap comprising:

a sleeve having a central axis and defining a cavity for receiving an end of the fiber optic connector, the cavity extending along the central axis of the sleeve and having an open end positioned opposite from a closed end;

at least one connector stop positioned within the sleeve, the at least one connector stop including a shoulder facing toward the open end of the sleeve, the shoulder adapted to abut an end of a connector body of the fiber optic connector when the dust cap is fully installed on the fiber optic connector;

a sealing face facing toward the open end of the sleeve and intermediately positioned between the open end and the closed end of the sleeve, the sealing face adapted to abut a first end of a release sleeve of the fiber optic connector when the dust cap is fully installed on the fiber optic connector; and at least one resilient latch adjacent the open end of the sleeve, the at least one resilient latch of the dust cap adapted to latch to a second end of the release sleeve of the fiber optic connector when the dust cap is fully installed on the fiber optic connector.

16. The dust cap of claim 15, further comprising a clearance recess adapted to house a terminal end of a ferrule of the fiber optic connector when the dust cap is fully installed on the fiber optic connector.

17. The dust cap of claim 15, further comprising at least one pin recess within the cavity of the sleeve, the at least one pin recess adapted to house an alignment pin of the fiber optic connector when the dust cap is fully installed on the fiber optic connector.

18. The dust cap of claim 15, wherein the at least one resilient latch includes a cantilevered arm extending from the sleeve in a direction predominantly from the closed end toward the open end of the sleeve.

19. The dust cap of claim 18, wherein the at least one resilient latch includes an inclined surface having a first end and a second end, the second end of the inclined surface positioned adjacent an end of the cantilevered arm and the first end of the inclined surface positioned nearer to the closed end and the central axis of the sleeve than the second end of the inclined surface, wherein the at least one resilient latch includes a peak adjacent the first end of the inclined surface, and wherein the at least one resilient latch includes a declined surface having a first end and a second end, the second end of the declined surface positioned adjacent the peak and the first end of the declined surface positioned nearer to the closed end and farther from the central axis of the sleeve than the second end of the declined surface.

20. The dust cap of claim 19, wherein the inclined surface of the at least one resilient latch spreads the end of the cantilevered arm away from the central axis by contacting the release sleeve of the fiber optic connector when the dust cap is installed over the fiber optic connector, wherein the end of the cantilevered arm at least partially returns toward the central axis when the dust cap is fully installed on the fiber optic connector, and wherein the declined surface of the at least one resilient latch is positioned adjacent the second end of the release sleeve when the dust cap is fully installed on the fiber optic connector.

21. The dust cap of claim 15, wherein the at least one resilient latch includes a pair of the resilient latches positioned on opposite sides of the central axis of the sleeve.

* * * * *